United States Patent
Onishi et al.

(10) Patent No.: US 12,304,442 B2
(45) Date of Patent: May 20, 2025

(54) CONTROLLER AND CONTROL METHOD

(71) Applicant: Robert Bosch GmbH, Stuttgart (DE)

(72) Inventors: Yoshitsuna Onishi, Kanagawa (JP);
Yoshihide Igari, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 158 days.

(21) Appl. No.: 18/248,154

(22) PCT Filed: Sep. 23, 2021

(86) PCT No.: PCT/IB2021/058672
§ 371 (c)(1),
(2) Date: Apr. 6, 2023

(87) PCT Pub. No.: WO2022/074493
PCT Pub. Date: Apr. 14, 2022

(65) Prior Publication Data
US 2023/0382357 A1 Nov. 30, 2023

(30) Foreign Application Priority Data
Oct. 9, 2020 (JP) .................. 2020-171010

(51) Int. Cl.
*B60T 7/12* (2006.01)
(52) U.S. Cl.
CPC ........... *B60T 7/12* (2013.01); *B60T 2201/022* (2013.01)
(58) Field of Classification Search
CPC ................ B60T 7/12; B60T 2201/022
See application file for complete search history.

(56) References Cited

U.S. PATENT DOCUMENTS

| | | | |
|---|---|---|---|
| 2019/0250619 A1* | 8/2019 | Gillett | B62M 6/45 |
| 2020/0017086 A1 | 1/2020 | Oshida | |
| 2020/0122694 A1* | 4/2020 | Eigel | B60W 30/09 |
| 2020/0276961 A1 | 9/2020 | Kaneta et al. | |
| 2023/0373449 A1* | 11/2023 | Onishi | B60T 8/1766 |
| 2023/0382357 A1* | 11/2023 | Onishi | B60T 7/12 |

FOREIGN PATENT DOCUMENTS

| | | | | |
|---|---|---|---|---|
| DE | 102014000882 A1 * | 8/2014 | | B60K 28/14 |
| DE | 102014001202 A1 * | 8/2014 | | B60T 7/12 |
| JP | 2009116882 A | 5/2009 | | |
| JP | 2017024644 A | 2/2017 | | |

(Continued)

OTHER PUBLICATIONS

International Search Report and Written Opinion for Application No. PCT/IB2021/058672 dated Jan. 12, 2022 (9 pages).

*Primary Examiner* — Joseph J Dallo
(74) *Attorney, Agent, or Firm* — Michael Best & Friedrich LLP

(57) ABSTRACT

The present disclosure obtains a controller and a control method capable of appropriately improving safety of a lean vehicle.
According to the controller and the control method, the controller has a control section (62) configured to perform a brake control to increase a braking force of the lean vehicle (100). The control section (62) performs the brake control based on a collision possibility that is determined in response to an output result from an environment sensor (44). The control section (62), in the brake control, controls the braking force based on posture information of the lean vehicle (100).

7 Claims, 4 Drawing Sheets

(56) References Cited

FOREIGN PATENT DOCUMENTS

| | | | |
|---|---|---|---|
| JP | 2020015364 A | 1/2020 | |
| JP | 2020029176 A | 2/2020 | |
| WO | WO-2015086167 A1 * | 6/2015 | .............. B60T 8/171 |
| WO | 2018154399 A1 | 8/2018 | |
| WO | WO-2018185578 A1 * | 10/2018 | ............ B60T 8/1706 |
| WO | 2020021382 A1 | 1/2020 | |
| WO | 2020162433 A1 | 8/2020 | |
| WO | WO-2022074493 A1 * | 4/2022 | ................ B60T 7/12 |
| WO | WO-2022074581 A1 * | 4/2022 | ................ B60T 7/22 |

* cited by examiner

[FIG. 1]
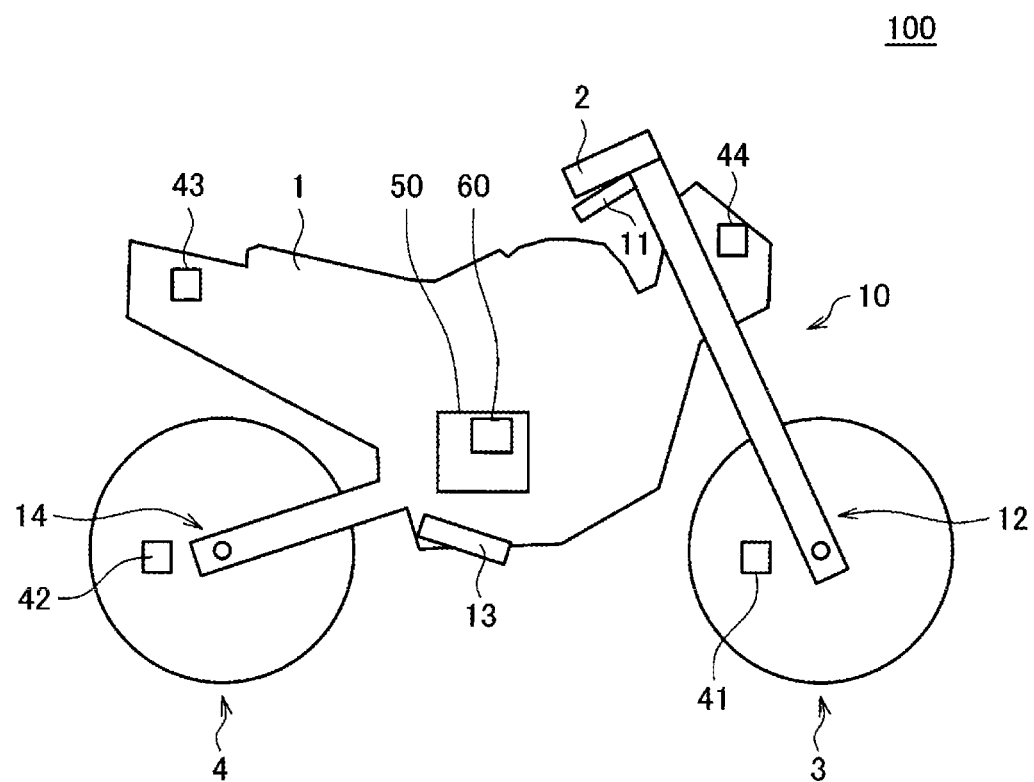

[FIG. 2]
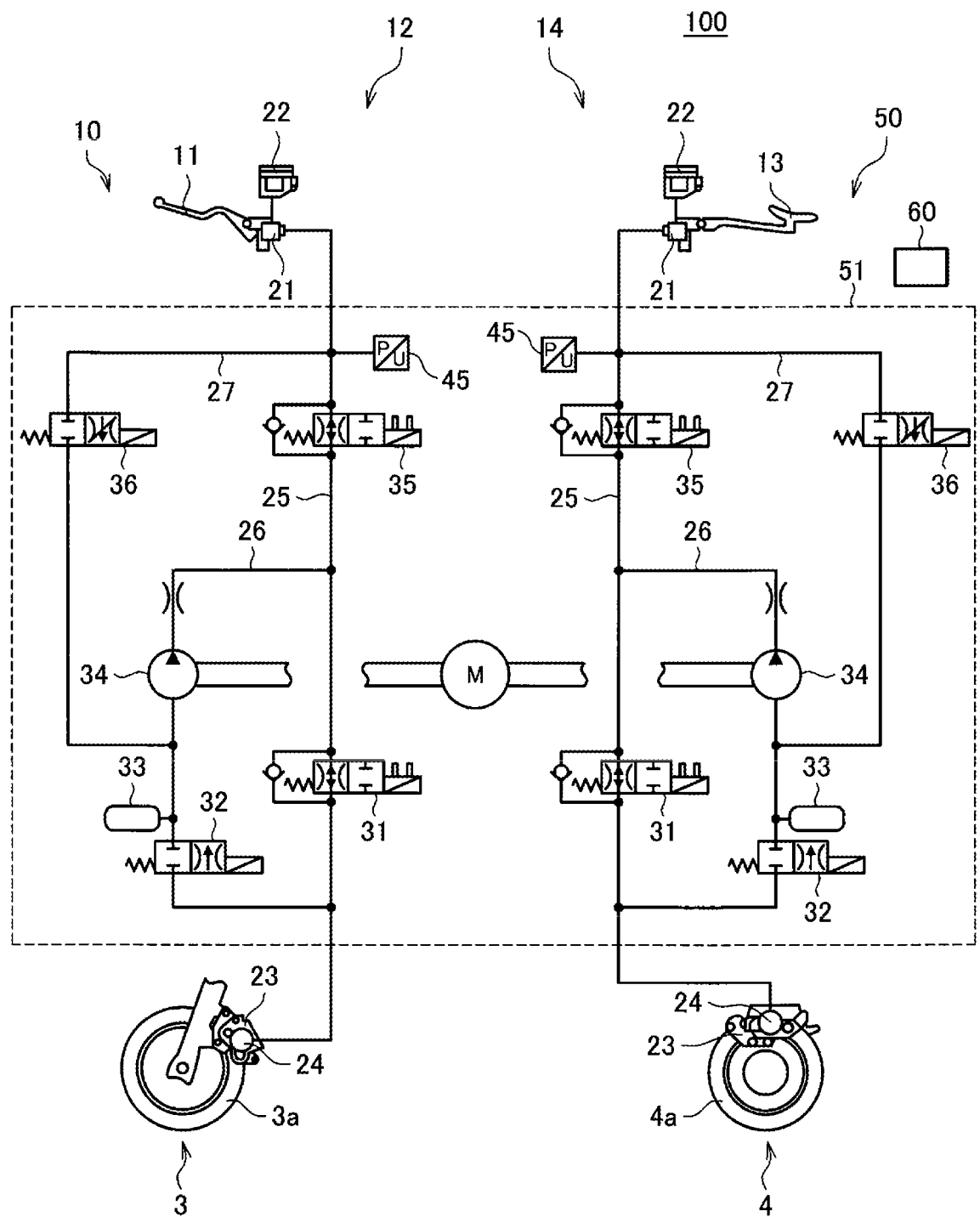

[FIG. 3]
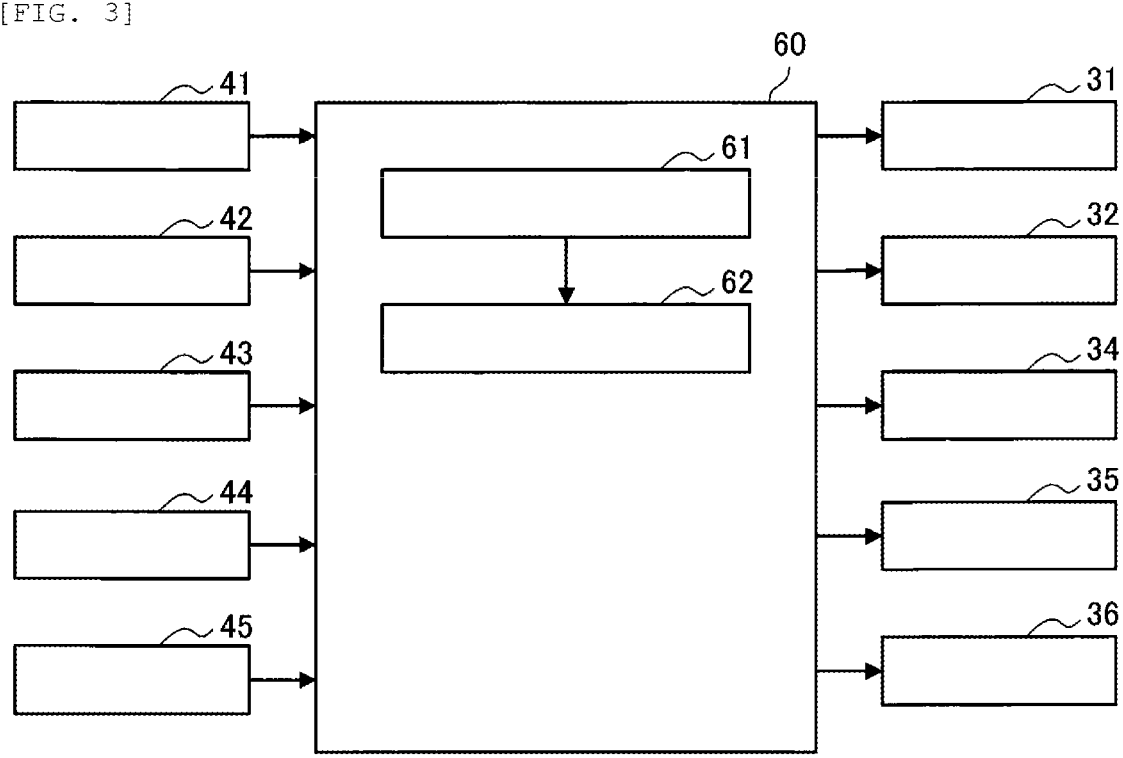
[FIG. 4]
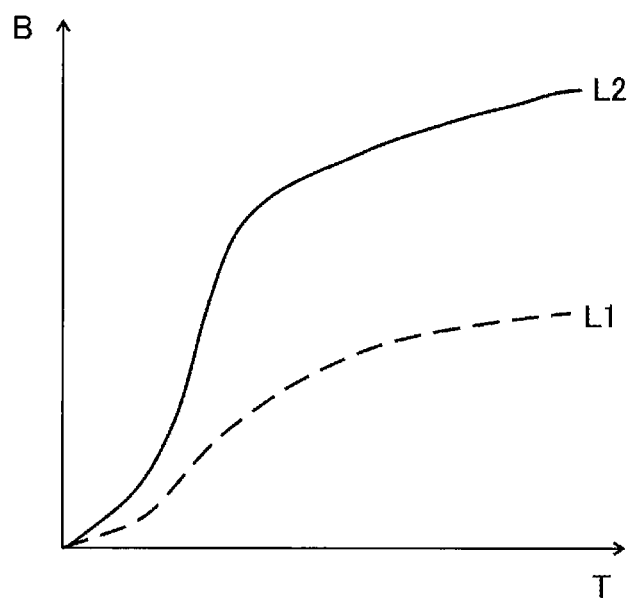

[FIG. 5]
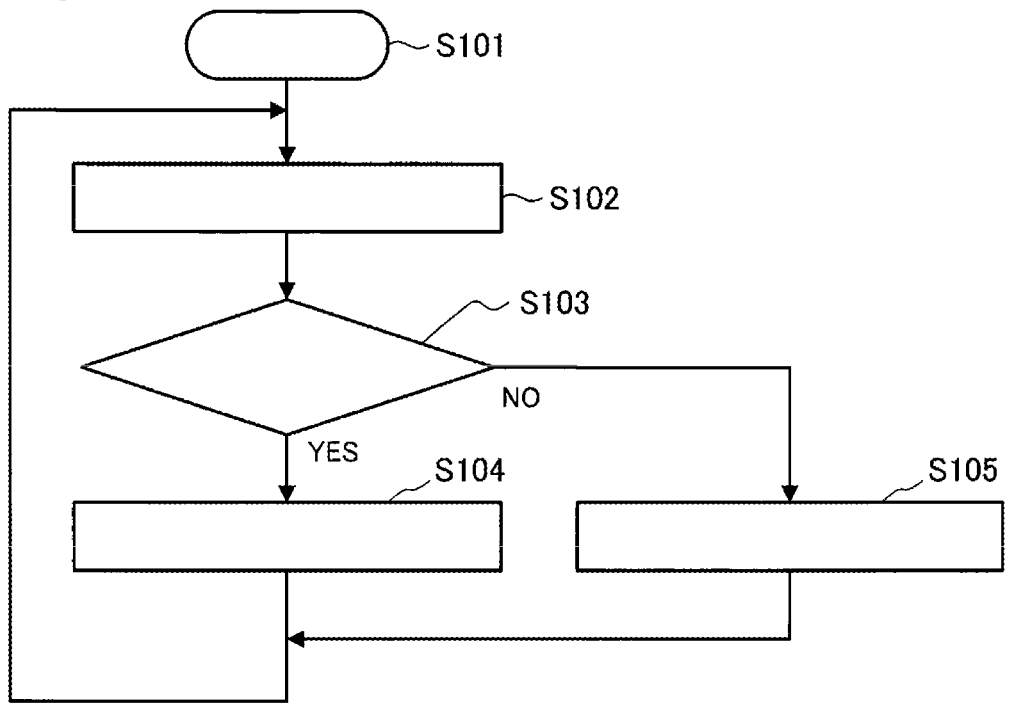
[FIG. 6]
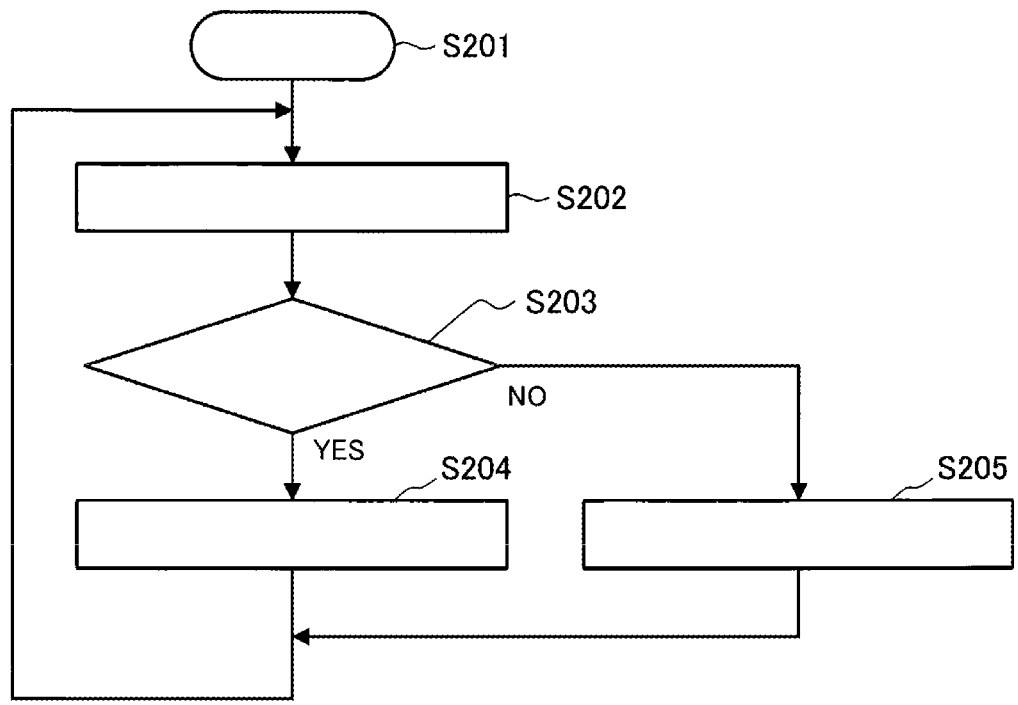

CONTROLLER AND CONTROL METHOD

BACKGROUND OF THE INVENTION

The present disclosure relates to a controller and a control method capable of appropriately improving safety of a lean vehicle.

Various techniques for improving safety of lean vehicles such as a motor cycle are known.

For example, JP2009-116882A discloses a driver assistance system. The driver assistance system has a sensor that detects an object located ahead of or substantially ahead of the lean vehicle in a travel direction. The driver assistance system makes a driver of the lean vehicle be informed that the lean vehicle approaches the object inappropriately based on information detected by the sensor.

A technique for a vehicle having four wheels is known to increase a braking force based on a collision possibility while a brake is operated so that a driver can drive the vehicle safely. Such brake operation may be referred to as emergency brake assist (EBA). Here, it is considered to adopt the EBA for a lean vehicle to improve safety of the lean vehicle. However, a posture of the lean vehicle tends to be unstable as compared to a posture of the vehicle having the four wheels. As such, when the EBA increases the braking force automatically regardless of driver's operation, the lean vehicle may lose a balance. Losing the balance may results in unsafety of the driver.

SUMMARY OF THE INVENTION

The present disclosure addresses the above-described issues. It is an objective of the present disclosure to provide a controller and a control method capable of appropriately improving safety of a lean vehicle.

As one aspect of the present disclosure, a controller controls behavior of a lean vehicle. The controller has a control section that performs a brake control to increase a braking force of the lean vehicle. The control section performs the brake control based on a collision possibility that is determined in response to an output result from an environment sensor. The control section, in the brake control, controls the braking force based on posture information of the lean vehicle.

As one aspect of the present disclosure, a control method for controlling behavior of a lean vehicle includes: performing, with a control section, a brake control to increase a braking force applied to the lean vehicle. The control section performs the brake control based on a collision possibility that is determined in response to an output result from an environment sensor. The control section controls the braking force based on posture information of the lean vehicle.

According to the present disclosure, the controller controls behavior of the lean vehicle. The controller has the control section that performs the brake control to increase the braking force of the lean vehicle. The control section performs the brake control based on the collision possibility that is determined in response to the output result from the environment sensor. The control section, in the brake control, controls the braking force based on posture information of the lean vehicle. According to the present disclosure, it is possible to suppress a posture of the lean vehicle from becoming unstable when the braking force is increased by the brake control. Therefore, it is possible to appropriately improve safety of the lean vehicle.

BRIEF DESCRIPTION OF THE DRAWINGS

FIG. 1 is a schematic view illustrating an outline configuration of a lean vehicle according to an embodiment of the present disclosure.

FIG. 2 is a schematic view of an outline configuration of a brake system according to the embodiment of the present disclosure.

FIG. 3 is a block diagram illustrating an exemplary functional configuration of a controller according to the embodiment of the present disclosure.

FIG. 4 is a schematic graph illustrating an exemplary relationship between a braking force that corresponds to a brake operation in EBA and the braking force of the lean vehicle according to the embodiment of the present disclosure.

FIG. 5 is a flowchart illustrating a first example of a processing procedure related to the EBA according to the embodiment of the present disclosure, the procedure being executed by the controller.

FIG. 6 is a flowchart illustrating a second example of the processing procedure related to the EBA according to the embodiment of the present disclosure, the procedure being executed by the controller.

DETAILED DESCRIPTION

A description will hereinafter be made on a controller according to the present disclosure with reference to the drawings.

The following description will be made on the controller that is used for a two-wheeled motorcycle (see a lean vehicle 100 in FIG. 1). However, a vehicle as a control target of the controller according to the present disclosure only needs to be a lean vehicle that travels in a state of being tilted in a turning direction during a turn, and may be a three-wheeled motorcycle, a pedal-driven vehicle, or the like, for example. The motorcycles include: a vehicle that has an engine as a propelling source; a vehicle that has an electric motor as the propelling source; and the like, and examples of the motorcycle are a bike, a scooter, and an electric scooter. The pedal-driven vehicle means a vehicle in general that can travel forward on a road by a depression force applied to pedals by a rider. The pedal-driven vehicles include a normal pedal-driven vehicle, an electrically-assisted pedal-driven vehicle, an electric pedal-driven vehicle, and the like.

In addition, the following description will be made on a case where each of a front-wheel brake mechanism and a rear-wheel brake mechanism is provided in one unit (see a front-wheel brake mechanism 12 and a rear-wheel brake mechanism 14 in FIG. 2). However, at least one of the front-wheel brake mechanism and the rear-wheel brake mechanism may be provided in multiple units. Alternatively, one of the front-wheel brake mechanism and the rear-wheel brake mechanism may not be provided.

A configuration, action, and the like, which will be described below, merely constitute one example. The controller and a control method according to the present disclosure are not limited to a case with such a configuration, such action, and the like.

The same or similar description will appropriately be simplified or will not be made below. In the drawings, the same or similar members or portions will not be denoted by a reference sign or will be denoted by the same reference sign. A detailed structure will appropriately be illustrated in a simplified manner or will not be illustrated.

\<Configuration of Lean Vehicle\>

A description will be made on a configuration of the lean vehicle 100 according to an embodiment of the present disclosure with reference to FIG. 1 to FIG. 3.

FIG. 1 is a schematic view illustrating an outline configuration of the lean vehicle 100. FIG. 2 is a schematic view illustrating an outline configuration of a brake system 10. FIG. 3 is a block diagram illustrating an exemplary functional configuration of a controller 60.

The lean vehicle 100 is a two-wheeled motorcycle that corresponds to an example of the lean vehicle according to the present disclosure. As illustrated in FIG. 1, the lean vehicle 100 includes: a trunk 1; a handlebar 2 that is held by the trunk 1 in a freely turnable manner; a front wheel 3 that is held by the trunk 1 in a freely turnable manner with the handlebar 2; a rear wheel 4 that is held by the trunk 1 in a freely rotatable manner; the brake system 10; a hydraulic pressure control unit 50 that is provided to the brake system 10; and the controller (ECU) 60 that is provided to the hydraulic pressure control unit 50. The lean vehicle 100 is also provided with, as sensors, a front-wheel rotational frequency sensor 41, a rear-wheel rotational frequency sensor 42, an inertial measurement unit (IMU) 43, an environment sensor 44, and a master-cylinder pressure sensor 45 (see FIG. 2). The lean vehicle 100 includes a drive source such as an engine or a motor and travels by using power that is output from the drive source.

As illustrated in FIG. 1 and FIG. 2, the brake system 10 includes: a first brake operation section 11; the front-wheel brake mechanism 12 that brakes the front wheel 3 in an interlocking manner with at least the first brake operation section 11; a second brake operation section 13; and the rear-wheel brake mechanism 14 that brakes the rear wheel 4 in an interlocking manner with at least the second brake operation section 13. The brake system 10 also includes the hydraulic pressure control unit 50, and the front-wheel brake mechanism 12 and the rear-wheel brake mechanism 14 are partially included in the hydraulic pressure control unit 50. The hydraulic pressure control unit 50 is a unit that has a function of controlling a braking force to be generated on the front wheel 3 by the front-wheel brake mechanism 12 and a braking force to be generated on the rear wheel 4 by the rear-wheel brake mechanism 14.

The first brake operation section 11 is provided to the handlebar 2 and is operated by the rider's hand. The first brake operation section 11 is a brake lever, for example. The second brake operation section 13 is provided to a lower portion of the trunk 1 and is operated by the rider's foot. The second brake operation section 13 is a brake pedal, for example. However, like a brake operation section of the scooter or the like, each of the first brake operation section 11 and the second brake operation section 13 may be the brake lever that is operated by the rider's hand.

Each of the front-wheel brake mechanism 12 and the rear-wheel brake mechanism 14 includes: a master cylinder 21 in which a piston (not illustrated) is installed; a reservoir 22 that is attached to the master cylinder 21; a brake caliper 23 that is held by the trunk 1 and has a brake pad (not illustrated); a wheel cylinder 24 that is provided to the brake caliper 23; a primary channel 25 through which a brake fluid in the master cylinder 21 flows into the wheel cylinder 24; a secondary channel 26 through which the brake fluid in the wheel cylinder 24 is released; and a supply channel 27 through which the brake fluid in the master cylinder 21 is supplied to the secondary channel 26.

An inlet valve (EV) 31 is provided to the primary channel 25. The secondary channel 26 bypasses a portion of the primary channel 25 between the wheel cylinder 24 side and the master cylinder 21 side of the inlet valve 31. The secondary channel 26 is sequentially provided with an outlet valve (AV) 32, an accumulator 33, and a pump 34 from an upstream side. Between an end on the master cylinder 21 side of the primary channel 25 and a portion of the primary channel 25 to which a downstream end of the secondary channel 26 is connected, a first valve (USV) 35 is provided. The supply channel 27 communicates between the master cylinder 21 and a portion on a suction side of the pump 34 in the secondary channel 26. A second valve (HSV) 36 is provided to the supply channel 27.

The inlet valve 31 is an electromagnetic valve that is opened in an unenergized state and closed in an energized state, for example. The outlet valve 32 is an electromagnetic valve that is closed in an unenergized state and opened in an energized state, for example. The first valve 35 is an electromagnetic valve that is opened in an unenergized state and is closed in an energized state, for example. The second valve 36 is an electromagnetic valve that is closed in an unenergized state and is opened in an energized state, for example.

The hydraulic pressure control unit 50 includes: components such as the inlet valves 31, the outlet valves 32, the accumulators 33, the pumps 34, the first valves 35, and the second valves 36 used to control a brake hydraulic pressure; a base body 51 to which those components are provided and in which channels constituting the primary channels 25, the secondary channels 26, and the supply channels 27 are formed; and the controller 60.

The base body 51 may be formed of one member or may be formed of multiple members. In addition, in the case where the base body 51 is formed of the multiple members, the components may separately be provided to the different members.

The controller 60 controls action of each of the components in the hydraulic pressure control unit 50. As a result, the braking force generated on the front wheel 3 by the front-wheel brake mechanism 12 and the braking force generated on the rear wheel 4 by the rear-wheel brake mechanism 14 are controlled.

During a normal time (that is, when the braking force corresponding to a brake operation by the rider is set to be generated on the wheels), the controller 60 opens the inlet valves 31, closes the outlet valves 32, opens the first valves 35, and closes the second valves 36. When the first brake operation section 11 is operated in such a state, in the front-wheel brake mechanism 12, the piston (not illustrated) in the master cylinder 21 is pressed to increase a hydraulic pressure of the brake fluid in the wheel cylinder 24, the brake pad (not illustrated) of the brake caliper 23 is then pressed against a rotor 3a of the front wheel 3, and the braking force is thereby generated on the front wheel 3. Meanwhile, when the second brake operation section 13 is operated, in the rear-wheel brake mechanism 14, the piston (not illustrated) in the master cylinder 21 is pressed to increase the hydraulic pressure of the brake fluid in the wheel cylinder 24, the brake pad (not illustrated) of the brake caliper 23 is then pressed against a rotor 4a of the rear wheel 4, and the braking force is thereby generated on the rear wheel 4.

The front-wheel rotational frequency sensor 41 is a rotational frequency sensor that detects a rotational frequency of the front wheel 3 (for example, a rotational frequency of the front wheel 3 per unit time [rpm], a travel distance of the front wheel 3 per unit time [km/h], or the like), and outputs a detection result. The front-wheel rotational frequency sensor 41 may detect another physical quantity that can substantially be converted to the rotational frequency of the front wheel 3. The front-wheel rotational frequency sensor 41 is provided to the front wheel 3.

The rear-wheel rotational frequency sensor 42 is a rotational frequency sensor that detects a rotational frequency of the rear wheel 4 (for example, the rotational frequency of the rear wheel 4 per unit time [rpm], a travel distance of the rear wheel 4 per unit time [km/h], or the like), and outputs a detection result. The rear-wheel rotational frequency sensor 42 may detect another physical quantity that can substantially be converted to the rotational frequency of the rear wheel 4. The rear-wheel rotational frequency sensor 42 is provided to the rear wheel 4.

The inertial measurement unit 43 includes a three-axis gyroscope sensor and a three-directional acceleration sensor, and detects a posture of the lean vehicle 100. For example, the inertial measurement unit 43 detects a pitching angle of the lean vehicle 100 (more specifically, a tilt angle in a pitching direction with respect to a horizontal direction in a front direction of the lean vehicle 100), and outputs a detection result. The inertial measurement unit 43 may detect another physical quantity that can substantially be converted to the pitching angle of the lean vehicle 100. In addition, for example, the inertial measurement unit 43 detects a lean angle of the lean vehicle 100 (more specifically, a tilt angle in a rolling direction with respect to a vertical direction in an upward direction of the lean vehicle 100), and outputs a detection result. The inertial measurement unit 43 may detect another physical quantity that can substantially be converted to the lean angle of the lean vehicle 100. The inertial measurement unit 43 is provided to the trunk 1, for example.

The environment sensor 44 detects environment information on environment in front of the lean vehicle 100. For example, the environment sensor 44 detects a preceding vehicle that is a vehicle located in front of the lean vehicle 100, and detects an inter-vehicular distance between the lean vehicle 100 and the preceding vehicle and a relative speed of the lean vehicle 100 to the preceding vehicle. The environment sensor 44 may detect another physical quantity that can substantially be converted to the inter-vehicular distance between the lean vehicle 100 and the preceding vehicle. In addition, the environment sensor 44 may detect another physical quantity that can substantially be converted to the relative speed of the lean vehicle 100 to the preceding vehicle. The environment sensor 44 is provided to a front portion of the trunk 1, for example. Here, the environment sensor 44 may detect, instead of the preceding vehicle, an object (for example, a road facility, a fallen object, a person, an animal, or the like) that is located in front of the lean vehicle 100, and may detect an inter-vehicular distance between the lean vehicle 100 and the object and a relative speed of the lean vehicle 100 to the object.

As the environment sensor 44, for example, a camera that captures an image in front of the lean vehicle 100 and a radar that can detect a distance from the lean vehicle 100 to a target in front are used. When the preceding vehicle is detected by using the image captured by the camera and the detection result of the preceding vehicle and a detection result by the radar are used, it is possible to detect the inter-vehicular distance between the lean vehicle 100 and the preceding vehicle and the relative speed of the lean vehicle 100 to the preceding vehicle. The configuration of the environment sensor 44 is not limited to that in the above example. For example, a stereo camera may be used as the environment sensor 44.

The master-cylinder pressure sensor 45 detects the brake hydraulic pressure in the master cylinder 21 (that is, a master cylinder pressure), and outputs a detection result. The master-cylinder pressure sensor 45 may detect another physical quantity that can substantially be converted to the master cylinder pressure. More specifically, the master-cylinder pressure sensor 45 is provided to each of the front-wheel brake mechanism 12 and the rear-wheel brake mechanism 14. In this way, the master cylinder pressure of the master cylinder 21 attached to the first brake operation section 11 and the master cylinder pressure of the master cylinder 21 attached to the second brake operation section 13 are separately detected.

The controller 60 controls behavior of the lean vehicle 100. For example, the controller 60 is partially or entirely constructed of a microcomputer, a microprocessor unit, or the like. Alternatively, the controller 60 may partially or entirely be constructed of a member in which firmware or the like can be updated, or may partially or entirely be a program module or the like that is executed by a command from a CPU or the like, for example. The controller 60 may be provided as one unit or may be divided into multiple units, for example.

As illustrated in FIG. 3, the controller 60 includes an acquisition section 61 and a control section 62, for example.

The acquisition section 61 acquires information from each of the devices mounted to the lean vehicle 100, and outputs the acquired information to the control section 62. For example, the acquisition section 61 acquires information from the front-wheel rotational frequency sensor 41, the rear-wheel rotational frequency sensor 42, the inertial measurement unit 43, the environment sensor 44, and the master-cylinder pressure sensor 45.

In order to control the behavior of the lean vehicle 100, the control section 62 executes braking control (that is, control of the braking force generated on the lean vehicle 100). More specifically, in the braking control, the control section 62 controls the action of each of the components of the hydraulic pressure control unit 50 in the brake system 10.

As described above, during the normal time, the control section 62 controls the operation of each of the components in the hydraulic pressure control unit 50 such that the braking force corresponding to the brake operation by the rider is generated on the wheels. Meanwhile, in a particular case, the control section 62 executes different braking control from that during the normal time.

For example, in the case where the wheel is locked or possibly locked, the control section 62 executes anti-lock brake control. In the anti-lock brake control, the braking force of the wheel is adjusted to such a braking force with which locking of the wheel can be avoided.

During execution of the anti-lock brake control, the control section 62 brings the lean vehicle 100 into a state where the inlet valve 31 is closed, the outlet valve 32 is opened, the first valve 35 is opened, and the second valve 36 is closed, and drives the pump 34 in such a state, so as to reduce the hydraulic pressure of the brake fluid in the wheel cylinder 24 and thereby reduce the braking force generated on the wheel. Then, the control section 62 closes both of the inlet valve 31 and the outlet valve 32 from the above state, so as to keep the hydraulic pressure of the brake fluid in the wheel cylinder 24 and keep the braking force generated on the wheel. Thereafter, the control section 62 opens the inlet valve 31 and closes the outlet valve 32, so as to increase the hydraulic pressure of the brake fluid in the wheel cylinder 24 and thereby increase the braking force generated on the wheel.

During the execution of the anti-lock brake control, the above control for reducing the braking force generated on the wheel (that is, braking force reduction control), the above control for keeping the braking force generated on the wheel (that is, braking force keeping control), and the above control for increasing the braking force generated on the wheel (that is, braking force increase control) are repeatedly executed in this order.

Here, in the case where a collision possibility with the preceding vehicle exceeds a reference in a situation where the brake operation is performed by the rider of the lean vehicle 100, the control section 62 performs a brake control referred to as an emergency brake assist (EBA). The EBA increases the braking force of the lean vehicle 100. Increasing the braking force of the lean vehicle 100 means increasing the braking force of the lean vehicle 100 to be larger than the braking force that corresponds to the brake operation. In the EBA, the braking force of the lean vehicle 100 is adjusted to such a magnitude of a braking force that can improve avoidability of the collision with the preceding vehicle.

The collision possibility is acquired based on an output result of the environment sensor 44. For example, based on the inter-vehicular distance between the lean vehicle 100 and the preceding vehicle and the relative speed of the lean vehicle 100 to the preceding vehicle, the control section 62 determines whether the collision possibility with the preceding vehicle exceeds the reference. For example, in the case where duration before reaching the preceding vehicle, which is determined from the inter-vehicular distance and the relative speed, is excessively short, the control section 62 determines that the collision possibility with the preceding vehicle exceeds the reference, and initiates the EBA.

During actuation of the EBA, the control section 62 brings the lean vehicle 100 into a state where the inlet valve 31 is opened, the outlet valve 32 is closed, the first valve 35 is closed, and the second valve 36 is opened, and drives the pump 34, so as to increase the hydraulic pressure of the brake fluid in the wheel cylinder 24. In this way, it is possible to increase the braking force generated on the wheel to be larger than the braking force that corresponds to the brake operation. That is, it is possible to increase the braking force on the lean vehicle 100. In the EBA, the control section 62 separately controls the front-wheel brake mechanism 12 and the rear-wheel brake mechanism 14, and can thereby separately control the braking force on the front wheel 3 and the braking force on the rear wheel 4. In the EBA, for example, the braking forces on the front wheel 3 and the rear wheel 4 are controlled such that a ratio between the braking force on the front wheel 3 and the braking force on the rear wheel 4 becomes a target ratio, which is set in advance.

As described above, in the controller 60, the control section 62 performs the EBA according to the collision possibility in the situation where the brake operation is performed by the rider of the lean vehicle 100. Here, in the EBA, the control section 62 controls the braking force of the lean vehicle 100 based on posture information of the lean vehicle 100. In this way, safety of the lean vehicle 100 is appropriately improved. A detailed description will be made below on such processing related to the EBA and performed by the controller 60.

<Action of Controller>

A description will be made on action of the controller 60 according to the embodiment of the present disclosure with reference to FIG. 4 to FIG. 6.

As described above, in this embodiment, the control section 62 performs the EBA according to the collision possibility in the situation where the brake operation is performed by the rider of the lean vehicle 100.

FIG. 4 is a schematic graph illustrating an exemplary relationship between the braking force that corresponds to the brake operation in the EBA and the braking force of the lean vehicle 100. In FIG. 4, a horizontal axis T represents time, and a vertical axis B represents the braking force. In addition, in FIG. 4, a broken line L1 represents the braking force that corresponds to the brake operation, and a solid line L2 represents the braking force of the lean vehicle 100.

As illustrated in FIG. 4, in the EBA, the braking force of the lean vehicle 100 represented by the solid line L2 is controlled to be larger than the braking force corresponding to the brake operation and represented by the broken line L1. That is, the braking force of the lean vehicle 100 is increased. In this way, the avoidability of the collision with the preceding vehicle is improved.

Here, when the braking force applied to the lean vehicle 100 is increased rapidly and drastically, the posture of the lean vehicle 100 may become unstable. For example, when the braking force is increased rapidly and drastically, a suspension of the lean vehicle 100 may shrins rapidly, and therefore the posture of the lean vehicle 100 changes rapidly and drastically.

The present embodiment addresses the above-described issues. Specifically, the control section 62, during the EBA, controls the braking force of the lean vehicle 100 based on the posture information of the lean vehicle 100 so that the posture of the lean vehicle 100 is prevented from being unstable. More specifically, the control section 62 adjusts a degree of increase in the braking force based on the posture information of the lean vehicle 100 so that the braking force is prevented from increasing rapidly and drastically. Thus, the posture of the lean vehicle 100 can be kept stable even when the braking force is increased during the EBA. Hereinafter, a flow of a processing relating to the EBA performed by the controller 60 will be described with a first example and a second example.

FIG. 5 is a flowchart illustrating the first example of the processing procedure related to the EBA and executed by the controller 60. A control flow illustrated in FIG. 5 is initiated when an initiation condition of the EBA (that is, a condition that the collision possibility with the preceding vehicle exceeds the reference) is satisfied. Step S101 in FIG. 5 corresponds to the initiation of the control flow illustrated in FIG. 5. In the control flow illustrated in FIG. 5, processing in steps S102 to S105 corresponds to a single calculation cycle, and each calculation cycle is repeated at specified time intervals. However, in the case where a termination condition of the EBA is satisfied in the middle of the control flow illustrated in FIG. 5, the control flow illustrated in FIG. 5 is terminated. As the termination condition of the EBA, for example, a condition that the brake operation by the rider is canceled can be used.

When the control flow illustrated in FIG. 5 is initiated, in step S102, the control section 62 determines a target increase amount of the braking force (that is, a target value of an increase amount of the braking force) of the lean vehicle 100 in the current calculation cycle.

Here, in the control flow illustrated in FIG. 5, as will be described below, the control section 62 increases the braking force of the lean vehicle 100 by a specified increase amount in each calculation cycle. That is, the increase amount of the braking force that is determined in each calculation cycle is an amount by which the braking force is increased per calculation cycle. In other words, the increase amount of the braking force determined in each calculation corresponds to the degree of increase in the braking force of the lean vehicle 100.

The control section 62 sets, as the target increase amount, such an increase amount of the braking force that can improve the avoidability of the collision with the preceding vehicle. For example, the control section 62 determines the target increase amount based on the inter-vehicular distance between the lean vehicle 100 and the preceding vehicle and the relative speed of the lean vehicle 100 to the preceding vehicle. However, the control section 62 may determine the target increase amount in consideration of relative acceleration of the lean vehicle 100 to the preceding vehicle.

Next, in step S103, the control section 62 determines whether the target increase amount of the braking force is equal to or smaller than an maximum increase amount (that is, an upper limit value of the increase amount). If it is determined that the target increase amount of the braking force is equal to or smaller than the maximum increase amount (step S103/YES), the processing proceeds to step S104, and the control section 62 increases the braking force of the lean vehicle 100 by the target increase amount. On the other hand, if it is determined that the target increase amount of the braking force is larger than the maximum increase amount (step S103/NO), the processing proceeds to step S105, and the control section 62 increases the braking force of the lean vehicle 100 by the maximum increase amount.

After step S104 or step S105, the processing returns to step S102, and the next calculation cycle is performed.

As described above, in the control flow illustrated in FIG. 5, the increase amount of the braking force of the lean vehicle 100 is limited to the maximum increase amount in each calculation cycle. Here, the maximum increase amount corresponds to an upper limit value of the degree of increase in the braking force of the lean vehicle 100. The control section 62 changes the maximum increase amount (i.e., the upper limit value of the degree of increase in the braking force of the lean vehicle 100) based on the posture information of the lean vehicle 100. The posture information is information on a physical quantity that is reflected to the posture of the lean vehicle 100.

For example, the posture information includes pitching angle information of the lean vehicle 100. The pitching angle information is information on the pitching angle of the lean vehicle 100 and can include, for example, information indicative of the pitching angle or information indicative of a pitch angular velocity (that is, a time rate of change of the pitching angle).

For example, the control section 62 reduces the maximum increase amount as an absolute value of the pitching angle or an absolute value of the pitch angular velocity of the lean vehicle 100 is increased. Here, the posture of the lean vehicle 100 is more likely to be changed in the pitching direction as the absolute value of the pitching angle or the absolute value of the pitch angular velocity of the lean vehicle 100 is increased. Accordingly, when the posture of the lean vehicle 100 is changed in the pitching direction easily, the control section 62 prevents the braking force of the lean vehicle 100 from increasing rapidly and drastically. Thus, the posture of the lean vehicle 10 can be prevented from changing rapidly in the pitching direction.

For example, the posture information includes lean angle information of the lean vehicle 100. The lean angle information is information on the lean angle of the lean vehicle 100 and can include, for example, information indicative of the lean angle or information indicative of a lean angular velocity (that is, a time rate of change of the lean angle).

For example, the control section 62 reduces the maximum increase amount as an absolute value of the lean angle or an absolute value of the lean angular velocity of the lean vehicle 100 is increased. Here, the posture of the lean vehicle 100 is more likely to be changed in the rolling direction as the absolute value of the lean angle or the absolute value of the lean angular velocity of the lean vehicle 100 is increased. Accordingly, when the posture of the lean vehicle 100 is changed in the rolling direction easily, the control section 62 prevents the braking force from increasing rapidly and drastically. Thus, the posture of the lean vehicle 100 can be prevented from changing rapidly in the rolling direction.

For example, the posture information includes acceleration/deceleration information of the lean vehicle 100. The acceleration/deceleration information is information on acceleration/deceleration of the lean vehicle 100. For example, the control section 62 can acquire the acceleration/deceleration information based on the rotational frequency of the front wheel 3 and the rotational frequency of the rear wheel 4.

For example, the control section 62 reduces the maximum increase amount as the deceleration of the lean vehicle 100 is increased. In this way, the control section 62 controls the degree of increase in the braking force of the lean vehicle appropriately so that the posture of the lean vehicle 100 is kept stable. That is, the control section 62 prevents the posture of the lean vehicle 100 from changing rapidly due to the rapid increase of the braking force of the lean vehicle 100. For example, such a rapid change in the posture of the lean vehicle 100 may be a rear lift-p, which is lifting of a rear portion of the lean vehicle 100.

Here, in the EBA, the control section 62 may control the braking force of the lean vehicle 100 in consideration of an operation amount of the brake operation by the rider. The operation amount of the brake operation is an index indicative of an operation amount of the brake operation section (more specifically, the first brake operation section 11 or the second brake operation section 13). For example, the operation amount related to the first brake operation section 11 may be the master cylinder pressure of the master cylinder 21, which is attached to the first brake operation section 11, or may be the operation amount itself of the first brake operation section 11 (that is, a brake operation amount). In addition, for example, the operation amount related to the second brake operation section 13 may be the master cylinder pressure of the master cylinder 21, which is attached to the second brake operation section 13, or may be the operation amount itself of the second brake operation section 13 (that is, the brake operation amount).

For example, in the control flow illustrated in FIG. 5, the control section 62 may change the maximum increase amount (i.e., the upper limit value of the degree of increase in the braking force of the lean vehicle 100) according to the operation amount by the rider. For example, the control section 62 may limit the maximum increase amount to be equal to or smaller than a value that is acquired by multiplying the increase amount per unit time of the braking force corresponding to the brake operation by a specified factor. Alternatively, for example, the control section 62 may limit the maximum increase amount to be equal to or smaller than a value that is acquired by adding a specified value to the increase amount per unit time of the braking force corresponding to the brake operation. In this way, it is possible to suppress the rapid increase in the braking force of the lean vehicle 100 that contradicts the rider's intention. Here, the rider may be able to set the maximum increase amount. In such a case, the control section 62 may determine the maximum increase amount according to a setting operation for the maximum increase amount by the rider.

FIG. 6 is a flowchart illustrating the second example of the processing procedure related to the EBA and executed by the controller 60. A control flow illustrated in FIG. 6 is initiated when the initiation condition of the EBA is satisfied. Step S201 in FIG. 6 corresponds to the initiation of the control flow illustrated in FIG. 6. In the control flow illustrated in FIG. 6, processing in steps S202 to S205 corresponds to the single calculation cycle, and each calculation cycle is repeated at the specified time intervals. Similar to the control flow illustrated in FIG. 5, in the case where the termination condition of the EBA is satisfied in the middle of the control flow illustrated in FIG. 6, the control flow illustrated in FIG. 6 is terminated.

When the control flow illustrated in FIG. 6 is initiated, in step S202, the control section 62 determines the target braking force (that is, the target value of the braking force) of the lean vehicle 100 in the current calculation cycle.

The control section 62 sets, as the target braking force, such a magnitude of the braking force that can improve the avoidability of the collision with the preceding vehicle. For example, the control section 62 determines the target braking force based on the inter-vehicular distance between the lean vehicle 100 and the preceding vehicle and the relative speed of the lean vehicle 100 to the preceding vehicle.

Next, in step S203, the control section 62 determines whether the target braking force is equal to or smaller than an maximum braking force (that is, an upper limit value of the braking force). If it is determined that the target braking force is equal to or smaller than the maximum braking force (step S203/YES), the processing proceeds to step S204, and the control section 62 controls the braking force of the lean vehicle 100 to the target braking force. On the other hand, if it is determined that the target braking force is larger than the maximum braking force (step S203/NO), the processing proceeds to step S205, and the control section 62 controls the braking force of the lean vehicle 100 to the maximum braking force.

After step S204 or step S205, the processing returns to step S202, and the next calculation cycle is performed.

As described above, in the control flow illustrated in FIG. 6, in each calculation cycle, the braking force of the lean vehicle 100 is limited to the maximum braking force. In this way, similar to the control flow illustrated in FIG. 5, the control section 62 prevents the degree of increase in the braking force of the lean vehicle 100 from becoming excessively acute. The control section 62 changes the maximum braking force (that is, the upper limit value of the braking force of the lean vehicle 100) based on the posture information of the lean vehicle 100. As described above, the posture information is the information on the physical quantity that is reflected to the posture of the lean vehicle 100, and can include the pitching angle information, the lean angle information, or the acceleration/deceleration information, for example.

For example, the control section 62 reduces the maximum braking force as the absolute value of the pitching angle or the absolute value of the pitch angular velocity of the lean vehicle 100 is increased. Accordingly, when the posture of the lean vehicle 100 is changed in the pitching direction easily, the control section 62 prevents the braking force of the lean vehicle 100 from changing rapidly and drastically. Thus, the control section 62 suppress the rapid change in the posture of the lean vehicle 100 in the pitching direction.

In addition, for example, the control section 62 reduces the maximum braking force as the absolute value of the lean angle or the absolute value of the lean angular velocity of the lean angle of the lean vehicle 100 is increased. In this way, when the posture of the lean vehicle 100 changes in the rolling direction easily, the control section 62 prevents the braking force of the lean vehicle 100 from increasing rapidly and drastically. Thus, the control section 62 suppress the rapid change in the posture of the lean vehicle 100 in the rolling direction.

In addition, for example, the control section 62 reduces the maximum braking force as the deceleration of the lean vehicle 100 is increased. In this way, the control section 62 adjusts the degree of increase in the braking force of the lean vehicle 100 appropriately. Thus, the posture of the lean vehicle 100 is kept stable.

As described above, in the EBA, the control section 62 may control the braking force of the lean vehicle 100 in consideration of the operation amount of the brake operation by the rider. For example, in the control flow illustrated in FIG. 6, the control section 62 may change the maximum braking force (that is, the upper limit value of the braking force of the lean vehicle 100) according to the operation amount by the rider. For example, the control section 62 may limit the maximum braking force to be equal to or smaller than a value that is acquired by multiplying the braking force corresponding to the brake operation by a specified factor. Alternatively, for example, the control section 62 may limit the maximum braking force to be equal to or smaller than a value that is acquired by adding a specified value to the braking force corresponding to the brake operation. In this way, it is possible to suppress the rapid increase in the braking force of the lean vehicle 100 that contradicts the rider's intention. Here, the rider may be able to set the maximum braking force. In such a case, the control section 62 may determine the maximum braking force according to a setting operation for the maximum braking force by the rider.

<Effects of Controller>

A description will be made on effects of the controller 60 according to the embodiment of the present disclosure.

In the controller 60, the control section 62 controls the braking force of the lean vehicle 100 based on the posture information of the lean vehicle 100 in the EBA. In this way, in the EBA, the control section 62 adjusts the degree of increase in the braking force appropriately based on the posture information of the lean vehicle 100. Specifically, the control section 62 suppresses the degree of increase in the braking force from becoming excessively acute. Thus, it is possible to suppress the posture of the lean vehicle 100 from becoming unstable when the EBA increases the braking force. Therefore, it is possible to appropriately improve the safety of the lean vehicle 100.

Preferably, according to the controller 60 of the present disclosure, the control section 62 changes the upper limit value of the degree of increase in the braking force of the lean vehicle 100 based on the posture information of the lean vehicle 100 during the EBA. In this way, the control section 62 adjusts the degree of increase in the braking force appropriate not to become excessively acute. Therefore, it is possible to appropriately suppress the posture of the lean vehicle 100 from becoming unstable when the EBA increases the braking force.

Preferably, in the controller 60, the control section 62 changes the upper limit value of the braking force of the lean vehicle 100 based on the posture information of the lean vehicle 100 in the EBA. In this way, the control section 62 adjusts the degree of increase in the braking force appropriately so that the degree of increase in the braking force does not become excessively acute. Therefore, it is possible to appropriately suppress the posture of the lean vehicle 100 from becoming unstable when the EBA increases the braking force.

Preferably, in the controller 60, the posture information includes the pitching angle information of the lean vehicle 100. In this way, the controller 60 adjusts the degree of increase in the braking force appropriately based on the pitching angle information of the lean vehicle 100. Accordingly, when the posture of the lean vehicle 100 changes in the pitching direction easily, the controller 60 suppresses a rapid change in the posture of the lean vehicle 100 in the pitching direction by preventing the braking force of the lean vehicle 100 from increasing rapidly and drastically.

Preferably in the controller 60, the posture information includes the lean angle information of the lean vehicle 100. In this way, the controller 60 adjusts the degree of increase in the braking force appropriately based on the lean angle information of the lean vehicle 100. Accordingly, in the case where the posture of the lean vehicle 100 is likely to be changed in the rolling direction, it is possible to suppress a rapid change in the posture of the lean vehicle 100 in the rolling direction by preventing the braking force of the lean vehicle 100 from increasing rapidly and drastically.

Preferably, in the controller 60, the posture information includes the acceleration/deceleration information of the lean vehicle 100. In this way, the controller 60 adjusts the degree of increase in the braking force appropriately based on the acceleration/deceleration information of the lean vehicle 100. Therefore, the posture of the lean vehicle 100 is kept stable.

Preferably, in the controller 60, the control section 62 controls the braking force of the lean vehicle 100 in consideration of the operation amount of the brake operation by the rider in the EBA. In this way, it is possible to suppress the rapid increase in the braking force of the lean vehicle 100 that contradicts the rider's intention. Therefore, it is possible to further improve the safety of the lean vehicle 100.

Preferably, in the controller 60, the control section 62 changes the upper limit value of the degree of increase in the braking force of the lean vehicle 100 according to the operation amount by the rider in the EBA. In this way, it is possible to appropriately suppress the rapid increase in the braking force of the lean vehicle 100 that contradicts the rider's intention.

Preferably, in the controller 60, the control section 62 changes the upper limit value of the braking force of the lean vehicle 100 according to the operation amount by the rider in the EBA. In this way, it is possible to appropriately suppress the rapid increase in the braking force of the lean vehicle 100 that contradicts the rider's intention.

The present disclosure is not limited to the embodiment that has been described. For example, only a part of the embodiment may be implemented.

REFERENCE SIGNS LIST

1: Trunk
2: Handlebar
3: Front wheel
3a: Rotor
4: Rear wheel
4a: Rotor
10: Brake system
11: First brake operation section
12: Front-wheel brake mechanism
13: Second brake operation section
14: Rear-wheel brake mechanism
21: Master cylinder
22: Reservoir
23: Brake caliper
24: Wheel cylinder
25: Primary channel
26: Secondary channel
27: Supply channel
31: Inlet valve
32: Outlet valve
33: Accumulator
34: Pump
35: First valve
36: Second valve
41: Front-wheel rotational frequency sensor
42: Rear-wheel rotational frequency sensor
43: Inertial measurement unit
44: Environment sensor
45: Master-cylinder pressure sensor
50: Hydraulic pressure control unit
51: Base body
60: Controller
61: Acquisition section
62: Control section
100: Lean vehicle

The invention claimed is:

1. A controller (60) that controls behavior of a lean vehicle (100), the controller comprising:
a control section (62) configured to perform a brake control to increase a braking force of the lean vehicle (100) in a situation where a brake operation is performed by a rider of the lean vehicle (100), the control section (62) configured to perform the brake control based on a collision possibility that is determined in response to an output result from an environment sensor (44), wherein
the control section (62), in the brake control performed based on the collision possibility in the situation where the brake operation is performed by the rider, controls the braking force based on posture information of the lean vehicle (100), and
the control section (62), in the brake control performed based on the collision possibility in the situation where the brake operation is performed by the rider, changes at least one selected from the group consisting of an upper limit value of a degree of increase in the braking force and an upper limit value of the braking force, based on an operation amount of the brake operation.

2. The controller (60) according to claim 1, wherein the control section (62), in the brake control performed based on the collision possibility in the situation where the brake operation is performed by the rider, changes the upper limit value of the degree of increase in the braking force based on the posture information of the lean vehicle (100).

3. The controller (60) according to claim 1, wherein the control section (62), in the brake control performed based on the collision possibility in the situation where the brake operation is performed by the rider, changes the upper limit value of the braking force based on the posture information of the lean vehicle (100).

4. The controller (60) according to claim 1, wherein the posture information includes pitching angle information of the lean vehicle (100).

5. The controller (60) according to claim 1, wherein
the posture information includes lean angle information of the lean vehicle (100).

6. The controller (60) according to claim 1, wherein
the posture information includes acceleration/deceleration information of the lean vehicle (100).

7. A control method for controlling behavior of a lean vehicle (100), the control method comprising:
performing, with a control section (62), a brake control to increase a braking force applied to the lean vehicle (100) in a situation where a brake operation is performed by a rider of the lean vehicle (100), the control section (62) configured to perform the brake control based on a collision possibility that is determined in response to an output result from an environment sensor (44), wherein
the control section (62), in the brake control performed based on the collision possibility in the situation where the brake operation is performed by the rider, controls the braking force based on posture information of the lean vehicle (100), and
the control section (62), in the brake control performed based on the collision possibility in the situation where the brake operation is performed by the rider, changes at least one selected from the group consisting of an upper limit value of a degree of increase in the braking force and an upper limit value of the braking force, based on an operation amount of the brake operation.

\* \* \* \* \*